United States Patent
Omatsu et al.

(10) Patent No.: US 7,905,671 B2
(45) Date of Patent: Mar. 15, 2011

(54) INK BACKFLOW PREVENTIVE FOR WATER-BASED BALL-POINT PENS

(75) Inventors: Takeshi Omatsu, Osaka (JP); Hirokazu Matsuda, Osaka (JP); Hiroshi Inoue, Osaka (JP)

(73) Assignee: Sakura Color Products Corporation, Osaka-shi (JP)

( * ) Notice: Subject to any disclaimer, the term of this patent is extended or adjusted under 35 U.S.C. 154(b) by 888 days.

(21) Appl. No.: 11/630,951

(22) PCT Filed: Jun. 30, 2005

(86) PCT No.: PCT/JP2005/012088
§ 371 (c)(1),
(2), (4) Date: May 31, 2007

(87) PCT Pub. No.: WO2006/003996
PCT Pub. Date: Jan. 12, 2006

(65) Prior Publication Data
US 2007/0237569 A1    Oct. 11, 2007

(30) Foreign Application Priority Data

Jul. 2, 2004  (JP) .................................. 2004-196292

(51) Int. Cl.
*B43K 7/08*     (2006.01)

(52) U.S. Cl. ....................................................... 401/142
(58) Field of Classification Search .................. 401/142, 401/141
See application file for complete search history.

(56) References Cited

U.S. PATENT DOCUMENTS

2005/0074273 A1   4/2005   Miyamoto et al.

FOREIGN PATENT DOCUMENTS

| JP | 11-50041 | 2/1999 |
| JP | 3016749 | 12/1999 |
| JP | 2001-353993 | 12/2001 |
| JP | 2004-142323 | 5/2004 |
| WO | WO 03/057507 | 7/2003 |

*Primary Examiner* — Huyen Le
(74) *Attorney, Agent, or Firm* — Hamre, Schumann, Mueller & Larson, P.C.

(57) ABSTRACT

The ink backflow preventive of the present invention contains at least refractory and/or involatile organic liquid substances and gelling agents, wherein the oil separation degree under the specific condition is prepared to be 1 to 15 %, in which as at least said gelling agents, styrene-based thermoplastic elastomer is contained and said styrene-based thermoplastic elastomer is composed of two or more of said styrene-based thermoplastic elastomer with the same molecular weight and with the different average molecular weight.

6 Claims, No Drawings

INK BACKFLOW PREVENTIVE FOR WATER-BASED BALL-POINT PENS

BACKGROUND OF THE INVENTION

1. Field of the Invention

The present invention relates to an ink back flow preventive for water-based ball-point pens and water-based ball-point pens provided with said ink backflow preventive.

2. Description of the Prior Art

Compared with an ink for oil-based ball-point pens of similar forms, an ink for water-based ball-point pens has lower viscosity. Therefore, a backflow preventive is provided in an ink containment tube opposite to a pen tip for the prevention of ink flowage.

The examined Japanese Patent Laid-Open publication No. 3016749 (patent document 1) shows that with a composition of compounding styrene-based thermoplastic elastomer in ambient temperature liquid-like hydrocarbon, all the performance required for a backflow preventive can be satisfied which includes not only prevention of ink flowage, but also preferable impact resistance, no oil separation, preferable followability, no thin spot of the ink, and no dripping or side leaking.

In the unexamined Japanese Patent Laid-Open publication No. 2001-353993 (patent document 2), although the object of this invention is to control rheology, with the similar composition to the examined Japanese Patent Laid-Open publication No. 3016749, a backflow preventive is provided with stable followability not depending on writing flow rate and writing speed.

However, when such a backflow preventive for water-based ball-point pens with large amount of ink consumption is used, following gets difficult in the midway of writing, thereby causing some broken written lines. Further, depending on the case, a whole back flow preventive gets deformed since only one part of the back flow preventive attempts to follow, causing gaps with an ink containment tube and therefore, ink flowage may occur from the rear end of a containment tube when a pen tip is directed upward.

In many cases, these phenomena get remarkable when exposed to under high temperature of about 50, and this is assumed to be that a back flow preventive which contains styrene-based thermoplastic elastomer tend to show remarkably strong rubber elasticity and together with adhesive property that styrene-based thermoplastic elastomer has, thereby showing the tendency of temporarily adhering to an ink containment tube.

The object of the present invention is to solve the above mentioned problems, to provide a backflow preventive hard to be deformed by itself in any case, with stable followability, and capable of securing an ink flow even when exposed to high temperature environment, and to provide a water-based ball-point pen provided therewith.

SUMMARY OF THE INVENTION

Therefore, as a result of intensive studies to solve the conventional drawbacks, the inventors have succeeded in obtaining the targeted backflow preventive and therefore have completed the present invention by containing at least refractory and/or involatile organic liquid substances and gelling agents and prepared to make oil separation degree 1 to 15% under specific condition.

Specific explanation goes as follows.

In other words, the present invention relates to a backflow preventive for water-based ball-point pens containing at least refractory and/or involatile organic liquid substances and gelling agents and prepared to make oil separation degree 1 to 15% specified by JIS K-2220 5.7 under 60° C. for 24 hours.

Further, the present invention relates to an ink backflow preventive for water-based ball-point pen in which said gelling agents contain one kind or more than two kinds of the gelling agents selected from metal soap, particle silica, and styrene-based thermoplastic elastomer. Moreover, the present invention relates to an ink backflow preventive for water-based ball-point pens containing at least styrene-based thermoplastic elastomer as gelling agents in which said styrene-based thermoplastic elastomer are composed of two kinds or more with the same molecular structure and the different average molecular weight.

In addition, the present invention relates to the invention of a manufacturing method of a backflow preventive for water-based ball-point pens containing at least refractory and/or involatile organic liquid substances and gelling agents and prepared to make oil separation degree 1 to 15% specified by JIS K-2220 5.7 under 60° C. for 24 hours, and the present invention relates to the invention of a manufacturing method of an ink backflow preventive for water-based ball-point pens containing at least styrene-based thermoplastic elastomer as gelling agents, in which said styrene-based thermoplastic elastomer is composed of two kinds or more with the same molecular structure and the different average molecular weight. Further, said oil separation degree is adjusted by kneading.

DESCRIPTION OF THE PREFERRED EMBODIMENTS

An ink backflow preventive for water-based ball-point pens of the present invention has characteristics in that it contains at least refractory and/or involatile organic liquid substances and gelling agents and that the oil separation degree is prepared so that the value specified by JIS K-2220 5.7 at 60° C. for 24 hours is 1 to 15% (mass %). For information, the oil separation degree specified by JIS K-2220 5.7 is the mass of oil content(s) represented on percentage fallen in drops separating within the specified temperature and within the specified time after putting a sample in a conical-shaped metal gauze followed by being hung on a beaker. When the oil separation degree gets more than 15%, separated oil content(s) is (are) collected at the rear end of a containment tube when stored with a pen tip directed upward, which not only damages the appearance but also the separated oil content(s) leaks (leak) outside of the containment tube. Further, the separated oil content(s) gets (get) mixed in an ink and from the relationship of difference in specific gravity, the separated oil content(s) gets (get) together at the pen tip portion, thereby inhibiting the ink out flow and sometimes causing poor writing.

On the other hand, when the oil separation degree gets less than 1%, and particularly when using the water-based ball-point pen that has much ink consumption, it becomes difficult for the backflow preventive to follow along the way of writing, thereby sometimes causing thin spots of written lines. Further, depending on the case, a whole backflow preventive is deformed by only some parts of the backflow preventive's following, which causes a gap between said body and an ink containment tube, thereby causing ink leakage when a pen tip is directed upward.

Regarding poor following when the oil separation degree gets less than 1%, it is considered that the backflow preventive is in a state as if it clung to the ink containment tube. In other words, when there is appropriate separated oil, the separated oil content(s) becomes (become) lubricants which follow the ink in a way that they slither in an ink containment tube, while on the other hand, it is considered that when the amount of separated oil content(s) is little, it becomes like a state of clinging with no lubricating effect.

Further, although said oil separation degree is prepared to be 1 to 15%, said oil separation degree is preferably 2 to 10% and more preferably 3 to 7%. Also, refractory and/or involatile organic liquid substances described herein mean liquid paraffin, mineral oil, polybutene, poly-α-olefin oils and the like and they can be used as base oil of a backflow preventive. Such refractory and/or involatile organic liquid substances can appropriately be selected depending on kinds of gelling agents to be used and compatibility with water-based ink compositions.

Further, a preferable embodiment of the present invention has characteristics in that it contains one or more than two kinds of gelling agents selected from metal soap, particle silica, and styrene-based thermoplastic elastomer.

As styrene-based thermoplastic elastomer, block copolymer of polystyrene-polyethylene/butylene rubber-polystyrene, block copolymer of polystyrene-polyethylene/propylene rubber-polystyrene, block copolymer of polystyrene-butadiene rubber-polystyrene, block copolymer of polystyrene-isoprene rubber-polystyrene, and the like can be exemplified.

As preferable commercially available products of block copolymer of polystyrene-polyethylene/butylene rubber-polystyrene, Clayton FG-1901X, Clayton G-1650, Clayton G-1651, Clayton G-1652, Clayton G-1654X, Clayton G-1657X, Clayton G-1726X, Clayton FG-1092X (all are manufactured by Clayton Polymer Japan Co., Ltd: trade names), Septon 8004, Septon 8006, Septon 8007 (all are manufactured by KURARAY CO., LTD: trade names), ToughtecM-1943, ToughtechM-1911, ToughtechM-1913 (all are manufactured by Asahi Kasei Corporation: trade names) and the like can be exemplified.

As preferable commercially available products of block copolymer of polystyrene-polyethylene/propylene rubber-polystyrene, Clayton G-1730 (manufactured by Clayton Polymer Japan Co., Ltd: trade name), Septon 2002, Septon 2005, Septon 2006, Septon 2007, Septon 2043, Septon 2063, Septon 2104, Septon 4033, Septon 4055, Septon 4077 (all are manufactured by KURARAY CO., LTD: trade names) and the like can be exemplified.

As preferable commercially available products of block copolymer of polystyrene-butadiene rubber-polystyrene, Clayton D-1101, ClaytonD-1102, ClaytonD-1155, ClaytonD-KX405, Clayton D-KX408, Clayton D-KX410, Clayton D-KX414, Clayton D-KX65S, Clayton D-KX403P, Clayton D-KX139S, Clayton D-KX155 P, Clayton D-1118, Clayton D-1116, Clayton D-1188X, Clayton D-1122 X, Clayton D-1300X, Califlex TR-1101S, Califlex TR-1184, Califlex TR-1186, Califlex TR-4113P, Califlex TR-4122P, Califlex TR-4260P (all are manufactured by Clayton Polymer Japan Co., Ltd: trade names), ToughpreneA, Toughprene-125, Toughprene-126, Toughprene-315, Solprene-T-411, Solprene-T-414, Solprene-T-416, Solprene-T-406, Solprene-T-475, Asaprene-T-475, Asaprene-T-420, Asaprene-T-430, Asaprene-T-431, Asaprene-T-432, Asaprene-T-436 (all are manufactured by Asahi Kasei Corporation: trade names), and the like can be exemplified.

As preferable commercially available block copolymer of polystyrene-isoprene rubber-polystyrene, Clayton D-KX-400P, Clayton D-KX-1113X, Clayton D-114X, Clayton D-1125X, Clayton d-1320X, ClaytonD-1107, ClaytonD-1112, ClaytonD-1113, Clayton D-1117, ClaytonD-1119, ClaytonD-1124, ClaytonD-1161, Clayton D-1111, Clayton D-KX406, Clayton D-KX603, Califlex TR-1107 (all are manufactured by Clayton Polymer Co., Ltd: trade names), Solprene-418 (manufactured by Asahi Kasei Corporation: trade name) and the like can be exemplified.

The content amount of gelling agents to be used is, when used alone, preferably about 0.5 to 5 wt % (more preferably 1 to 3 wt %) in the case of metal soap, about 2 to 10 wt % (more preferably 3 to 8 wt %) in the case of particle silica, about 0.3 to 10 wt % of styrene-based thermoplastic elastomer (more preferably 0.5 to 8 wt %) with respect to the total amount of a backflow preventive.

In each raw material, when the compounding amount gets less than the above, satisfactory viscoelasticity cannot be obtained as a backflow preventive, and further, appropriate oil separation degree cannot be obtained, either. In other words, when observed as a water-based ball-point pen, ink leakage occurs even with light impact and ink backflow occurs when the ball-point pen is left with its pen tip directed upward. In addition, since appropriate oil separation degree cannot be obtained, even if an ink is consumed, a backflow preventive clings to the ink containment tube and as a backflow preventive gradually decreases, the function may not be fully developed. On the other hand, when the compounding amount gets more than the above, the backflow preventive gets hardened and due to poor followability, thin spots in written lines may be generated.

Further, the present invention has notable characteristics in that two or more kinds of styrene-based thermoplastic elastomers with the same molecular structure and with different average molecular weight are compounded. Therefore, in the present invention, it is important that the styrene-based thermoplastic elastomer is composed of two or more styrene-based thermoplastic elastomers with the same lines (kinds and arrangements) of comonomers and with the different average molecular weight due to the different numbers. For example, the average molecular weight is made different by making one out of two kinds of block copolymer of polystyrene-polyethylene/butylenes rubber-polystyrene (SEBS elastomer) and by making the other the same block copolymer of polystyrene-polyethylene/butylenes rubber-polystyrene (SEBS elastomer).

This becomes very important means in adjusting oil separation degree. For example, by compounding one kind of styrene-based thermoplastic elastomer, adjustment of the oil separation degree is sometimes required even though the general property as a backflow preventive is satisfied. And when the compounding amount of one kind of styrene-based thermoplastic elastomer is changed here, a general property as a backflow preventive cannot be satisfied. Thus, to compound styrene-based thermoplastic elastomer with the same molecular structure and with different average molecular weight becomes effective means. For example, when styrene-based thermoplastic elastomer with less molecular weight is compounded, it functions in the direction of lowering the oil separation degree without making big changes by appearance.

Although Examined Patent Publication No. 3016749 and Unexamined Patent Publication No. 2001-353993 disclose the usage of combining two or more different kinds of thermoplastic elastomer, they do not describe compounding styrene-based thermoplastic elastomers with the same molecular structure and with the different average molecular weight that are the means of the present invention. The object of the Unexamined Patent Publication No. 2001-353993 is to adjust the viscoelasticity and therefore, the Unexamined Patent Publication No. 2001-353993 has the totally different object from that of the preset invention. In addition, likewise, it is assumed that the same thing can be said about the object of the Examined Patent Publication No. 3016749.

Further, since styrene-based thermoplastic elastomer has more preferable strength compared with non-styrene-based thermoplastic elastomer such as olefin-based thermoplastic elastomer and the like, even when the styrene-based thermoplastic elastomer is filled in an ink containment tube with a large inner diameter of 2 to 10 mm, a backflow preventive retains a shape preserving property in a satisfactory degree.

Therefore, the preferable ball-point pen can be prepared provided with an ink containment tube with an inner diameter of 2 to 10 mm having a ball-point pen tip whose ink discharge amount is at least 200 mg/loom at 25° C., wherein a water-based ink is contained in said ink containment tube and the backflow preventive is contained at the rear end of the water-based ink, said backflow preventive contains at least refractory and/or involatile organic liquid substances and gelling agents, the oil separation degree specified by JIS K-2220 5.7 at 60° C. for 24 hours is prepared to be 1 to 15%, and styrene-based thermoplastic elastomer is contained as said gelling agents.

Moreover, the present invention has notable characteristics in that the oil separation degree is adjusted by kneading. When the kneading is strengthened, the relationship is that the viscosity of a backflow preventive becomes low, and the oil separation degree becomes low, too. On the other hand, when the kneading is weakened, the relationship is that the viscosity of a backflow preventive becomes high, and the oil separation degree becomes high, too. Thus, in order to adjust to make the oil separation degree specified by JIS K-2220 5.7 under 60° C. for 24 hours be 1 to 15% described earlier, it is enough to adjust the degree of kneading.

For example, in the method of manufacturing a backflow preventive for water-based ball-point pens of the present invention, when styrene-based thermoplastic elastomer and the like that are hard to be dissolved under a room temperature are added, as required, heating and stirring, heating and kneading, and the like are available. Then, since these form gels with remarkably strong elasticity in the vicinity of a room temperature, although in this state, it is difficult to fill in an ink containment tube, the hardness of a backflow preventive can be adjusted by further kneading again with such dispersing machines as roll mills and the like and such kneading machines as kneaders, planetary mixers, and the like.

Further, by kneading again, it is important to control the change in oil separation degree with the change of hardness of a backflow preventive. In many cases, since the oil separation degree lowers by repeated kneading, it is necessary to adjust the kneading degree so that the oil separation degree is within the range of 1 to 15%.

Moreover, as required, surfactants, antioxidants, and the like can be compounded. However, care must be taken in compounding since there is a possibility that the oil separation degree cannot be in the range of 1 to 15% even when the gelling agents are compounded in a specific amount when the surfactants, antioxidants, and the like are compounded more than a required level because, some of them may greatly change the oil separation degree.

There is no restriction as to the ink used for water-based ball-point pens of the present invention.

Further, when air bubble is present in the manufactured ink backflow preventive, it is preferable to remove the air bubble by vacuum defoaming, stirring vacuum defoaming, and the like. However, since stirring vacuum defoaming accompanies kneading, care must be taken so that the oil separation degree is 1 to 15%.

EXAMPLE

Next, the present invention is explained in detail using Examples and Comparative Examples. However, the present invention is not limited to these.

Water-based inks for ball-point pens used in the Examples and Comparative Examples were prepared as follows:

| | |
|---|---|
| Resin emulsion: Nikazol FX-555A (manufactured by Nippon Carbide Industries Co., Inc: trade name) | 48.0 parts by weight |
| :Mowinyl 972 (manufactured by Clariant Polymer Co., Ltd: trade name) | 32.0 parts by weight |
| Colorant: NKW-6007 (manufactured by Nippon Keiko Co., Ltd: trade name) | 2.0 parts by weight |
| Film forming assistant: TEXANOL | 0.2 part by weight |
| Ion exchange water: | 17.8 parts by weight |

The above mentioned compounds were stirred, followed by removing coarse particles by centrifugal separation, thereby obtaining water-based red colored ink for ball-point pens.

Examples 1 to 8, Comparative Examples 1 to 5

With the composition shown in Table 1 and by one of the methods of I to HO as shown below, an ink backflow preventive for water-based ball-point pens of Examples 1 to 8 and Comparative Examples 1 to 5 were prepared. Each ink backflow preventive and each of said ink were filled in an ink containment tube with an inner diameter of 4 mm having a ball-point pen tip with a ball diameter of 0.8 mm. The backflow preventives were filled so that their length is 10 mm. The results of the tests conducted based on the following items with respect to each pen are shown in Table 2 together with the evaluation result of the oil separation degree.

<Preparation Method of an Ink Backflow Preventive (Ink Follower)>

Method I: Gelling agents were added to the base oil and were stirred for about 30 minutes at 170 to 180° C. to dissolve them, followed by cooling to a room temperature, further followed by conducting roll treatment once, and then finally being left at rest for defoaming, thereby obtaining an ink backflow preventive.

Method RO: Gelling agents were added to the base oil and were stirred for about 30 minutes at 170 to 180° C. to dissolve them, followed by cooling to a room temperature, further followed by conducting roll treatment three times, and then finally being left at rest for defoaming, thereby obtaining an ink backflow preventive.

Method HA: Gelling agents were added to the base oil and were stirred for about 30 minutes at 170 to 180° C. to dissolve them, followed by cooling to a room temperature, further followed by conducting roll treatment once, and then finally stirring and defoaming for 10 minutes with a planetary mixer, thereby obtaining an ink backflow preventive.

Method NI: Gelling agents were added to the base oil and were stirred for about 30 minutes at 170 to 180° C. to dissolve them, followed by cooling to a room temperature, further followed by stirring for 10 minutes with a planetary mixer in a vacuum state, thereby obtaining an ink backflow preventive.

Method HO: Gelling agents were added to the base oil and were stirred for about 30 minutes at 170 to 180° C. to dissolve them, followed by cooling to a room temperature, further followed by stirring for 30 minutes with a planetary mixer in a vacuum state, thereby obtaining an ink backflow preventive.

TABLE 1

| | | | Examples | | | | | | | | Comparative Examples | | | | |
|---|---|---|---|---|---|---|---|---|---|---|---|---|---|---|---|
| | | | 1 | 2 | 3 | 4 | 5 | 6 | 7 | 8 | 1 | 2 | 3 | 4 | 5 |
| Compounding of an ink follower | Base oil | Mineral oil A (Note 1) | | | 30.0 | 61.5 | | 96.0 | | | | 65.0 | 97.5 | | |
| | | Mineral oil B (Note 2) | 95.5 | 96.0 | 65.0 | | 60.0 | | 96.0 | 65.0 | 95.5 | | | 60.0 | 64.0 |
| | | Polybutene A (Note 3) | | | | 35.0 | | | | 30.0 | | 30.0 | | | 30.0 |
| | | Polybutene B (Note 4) | | | | | 34.0 | | | | | | | 34.5 | |
| | Gelling agent | Styrene-based thermoplastic elastomer A (Note 5) | 2.0 | 2.0 | 2.0 | 1.0 | | | 2.5 | 3.0 | 2.0 | 1.5 | | | 4.0 |
| | | Styrene-based thermoplastic elastomer B (Note 6) | | | | | 1.5 | | | | | | | | |
| | | Styrene-based thermoplastic elastomer C (Note 7) | 1.0 | 0.5 | 1.5 | | | | | | 1.0 | | | | |
| | | Styrene-based thermoplastic elastomer D (Note 8) | | | | | | 1.5 | | | | | 1.5 | 1.5 | |
| | | Styrene-based thermoplastic elastomer E (Note 9) | | | | 1.0 | 0.5 | | | 2.0 | | 1.5 | | | 2.0 |
| | | Metal soap (Note 10) | 1.5 | 1.5 | 1.5 | 1.5 | | | 1.5 | | 1.5 | 2.0 | | | |
| | | Particle silica (Note 11) | | | | | 4.0 | 2.5 | | | | | 1.0 | 4.0 | |
| | | Total | 100.0 | 100.0 | 100.0 | 100.0 | 100.0 | 100.0 | 100.0 | 100.0 | 100.0 | 100.0 | 100.0 | 100.0 | 100.0 |
| Preparation method of an ink backflow preventive | | | I | I | NI | I | NI | HA | NI | I | RO | HO | RO | HA | HO |

Explanatory notes of the Table are as follows.
Note 1:
Diana Process Oil PW-90 (Manufactured by Idemitsu Kosan Co., Ltd.: trade name)
Note 2:
Diana Process Oil PW-380 (Manufactured by Idemitsu Kosan Co., Ltd.: trade name)
Note 3:
Nissan Polybutene 3 N(Manufactured by NOF CORPORATION: trade name)
Note 4:
Nissan Polybutene 015 N(Manufactured by NOF CORPORATION: trade name)
Note 5:
Clayton G-1654 X(Manufactured by Clayton Polymer Japan Co., Ltd.: trade name)
Note 6:
Clayton G-1652 (Manufactured by Clayton Polymer Japan Co., Ltd.: trade name)
Note 7:
Clayton G-1650 (Manufactured by Clayton Polymer Japan Co., Ltd.: trade name)
Note 8:
Asaprene T-431 (Manufactured by Asahi Kasei Corporation: trade name)
Note 9:
Clayton G-1730 (Manufactured by Clayton Polymer Japan Co., Ltd: trade name)
Note 10:
Aluminum stearate 300 (Manufactured by NOF Corporation: trade name)
Note 11:
Aerosil #200 (Manufactured by Nippon Aerosil Co., Ltd: trade name)

Next, the evaluation methods are shown.

<Evaluation on Oil Separation Degree>

The oil separation degree was evaluated under 60° C. for 24 hours by the method specified by JIS K-22205.7. The measurement result is shown in mass %.

<Impact Resistance>

Evaluation was made under the following criteria by letting a sample pen with its pen tip directed upward fall from 1 meter height to a cryptomeria board once, thereby observing a state of a pen ink and a backflow preventive after fall.

○: No scattering of an ink and almost no deformation of a backflow preventive is acknowledged.

Δ: No scattering of an ink but deformation of a backflow preventive is acknowledged.

X: Scattering of an ink from the rear end of an ink containment tube is acknowledged.

<Reversion of a Backflow Preventive and an Ink>

Evaluation was made based on the following criteria by visual observation of an ink containment tube whether the backflow preventive moved to the pen tip side or not (whether there was a reversion of a backflow preventive) by taking out a pen sample after it was left with its pen tip directed upward for 1 month under the condition of 50° C.

○: No reversion of a backflow preventive is acknowledged.

X: Reversion of a backflow preventive is acknowledged.

<Followability>

Evaluation was made based on the following criteria by observing a state of a backflow preventive, making continuous writing with a sample pen attached to a writing test machine on paper based on the ISO standard under the following condition.

Writing speed: 7.0 cm/sec
Writing angle: 65°
Writing load: 100 g

○: It followed with ink outflow

X: It did not follow since a backflow preventive clung to an ink containment tube.

<Ink Outflow Stability>

Evaluation was made based on the following criteria by observing a state of written lines, making continuous writing with a sample pen attached to a writing test machine on paper based on the ISO standard under the following condition.
Writing speed: 7.0 cm/sec
Writing angle: 65°
Writing load: 100 g
◯: Outflow amount was stable and no thin spot was generated.
Δ: Outflow amount was remarkably little and the written mark had some thin spots.
X: At first, the written mark had some thin spots but along the way, outflow amount greatly increased.

<Followability After Storage at a High Temperature>

Evaluation was made based on the following criteria by observing a state of a backflow preventive, making continuous writing with a sample pen attached to a writing test machine on paper based on the ISO standard after a sample pen was left being placed horizontally for 1 month under the condition of 50° C.
Writing speed: 7.0 cm/sec
Writing angle: 65°
Writing load: 100 g
◯: It followed with ink outflow
X: It did not follow since a backflow preventive clung to an ink containment tube.

TABLE 2

|  | Examples | | | | | | | | Comparative Examples | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Oil separation degree (mass %) | 7.2 | 9.5 | 4.2 | 5.1 | 6.3 | 8.3 | 2.6 | 1.3 | 0.5 | 0.3 | 0.8 | 0.5 | 0.1 |
| Impact resistance | ◯ | ◯ | ◯ | ◯ | ◯ | ◯ | ◯ | ◯ | ◯ | ◯ | X | Δ | ◯ |
| Backflow preventive and ink reversion | ◯ | ◯ | ◯ | ◯ | ◯ | ◯ | ◯ | ◯ | ◯ | ◯ | ◯ | ◯ | ◯ |
| Followability | ◯ | ◯ | ◯ | ◯ | ◯ | ◯ | ◯ | ◯ | X | ◯ | ◯ | X | X |
| Ink outflow stability | ◯ | ◯ | ◯ | ◯ | ◯ | ◯ | ◯ | ◯ | X | Δ | ◯ | Δ | ◯ |
| Followability after storage at a high temperature | ◯ | ◯ | ◯ | ◯ | ◯ | ◯ | ◯ | ◯ | X | X | X | X | X |

Effect of the Invention

Since an ink backflow preventive of the present invention is hard to deform itself in any case and shows stable ink followability, a ball-point pen provided therewith has very good performance not only capable of securing stable ink flowage even when exposed to high temperature environment, but also excellent in impact resistance and causing no reversion phenomena of an ink backflow preventive.

Industrial Applicability

The present invention can be utilized as an ink backflow preventive which is filled in an ink containment tube.

What is claimed is:

1. A backflow preventive for water-based ball-point pens containing
   at least one selected from the group consisting of a refractory substance and an involatile organic liquid substance; and
   a gelling agent,
   wherein an oil separation degree of the back flow preventive as specified by JIS K-2220 5.7 at 60° C. for 24 hours is 1 to 15%,
   wherein the gelling agent includes two or more kinds of styrene-based thermoplastic elastomer having the same molecular structure and a different average molecular weight from one another.

2. The backflow preventive for water-based ball-point pens as set forth in claim 1, further comprising at least one selected from the group consisting of metal soap, and particle silica.

3. A method for manufacturing a backflow preventive for water-based ball-point pens, comprising:
   compounding a gelling agent and at least one selected from the group consisting of a refractory substance and an involatile organic liquid substance,
   wherein an oil separation degree of the back flow preventive as specified by JIS K-2220 5.7 at 60° C. for 24 hours is 1 to 15%,
   wherein the gelling agent includes two or more kinds of styrene-based thermoplastic elastomer having the same molecular structure and a different average molecular weight from one another.

4. The method for manufacturing a backflow preventive for water-based ball-point pens as set forth in claim 3, wherein said oil separation degree is adjusted by kneading.

5. A ball-point pen with a water-based ink filled in an ink containment tube,
   wherein the ball-point pen includes a backflow preventive, the backflow preventive being filled in a rear end of the ink containment tube,
   wherein said backflow preventive contains
      at least one selected from the group consisting of a refractory substance and an involatile organic liquid substance, and
      a gelling agent,
   wherein an oil separation degree of the back flow preventive as specified by JIS K-2220 5.7 at 60° C. for 24 hours is 1 to 15%,
   wherein the gelling agent includes two or more kinds of styrene-based thermoplastic elastomer having the same molecular structure and a different average molecular weight from one another.

6. A ball-point pen provided with an ink containment tube and a ball-point pen tip, an inner diameter of the ball point tip being 2 to 10 mm, and the ball-point pen having an ink discharge amount that is at least 200 mg/100 m at 25° C.,
   wherein a water-based ink is filled in said ink containment tube,
   wherein the ball-point pen includes a backflow preventive, the backflow preventive being filled in a rear end of the ink containment tube, wherein said backflow preventive contains
at least one selected from the group consisting of a refractory substance and an involatile organic liquid substance, and
a gelling agent,
wherein an oil separation degree of the back flow preventive as specified by JIS K-2220 5.7 at 60° C. for 24 hours is 1 to 15%, wherein the gelling agent includes two or more kinds of styrene-based thermoplastic elastomer having the same molecular structure and a different average molecular weight from one another.

* * * * *